(12) United States Patent
Ehrke

(10) Patent No.: US 7,236,924 B2
(45) Date of Patent: Jun. 26, 2007

(54) DEVICE FOR INPUTTING NAMES INTO NAVIGATION SYSTEM AND A CORRESPONDING NAVIGATION SYSTEM FOR MOTOR VEHICLES

(75) Inventor: Jens Ehrke, Bahrernfleth (DE)

(73) Assignee: Robert Bosch GmbH, Stuttgart (DE)

( * ) Notice: Subject to any disclaimer, the term of this patent is extended or adjusted under 35 U.S.C. 154(b) by 1034 days.

(21) Appl. No.: 10/031,517

(22) PCT Filed: May 18, 2001

(86) PCT No.: PCT/DE01/01875

§ 371 (c)(1),
(2), (4) Date: May 13, 2002

(87) PCT Pub. No.: WO01/90696

PCT Pub. Date: Nov. 29, 2001

(65) Prior Publication Data

US 2002/0152080 A1    Oct. 17, 2002

(30) Foreign Application Priority Data

May 20, 2000  (DE) ............................ 100 25 042

(51) Int. Cl.
*G06F 17/21* (2006.01)
*G06F 17/00* (2006.01)
*G01C 21/00* (2006.01)

(52) U.S. Cl. .................. 704/10; 715/534; 701/200
(58) Field of Classification Search ............ 704/8–10; 701/200–201; 707/3; 715/534
See application file for complete search history.

(56) References Cited

U.S. PATENT DOCUMENTS

| 5,568,390 | A | * | 10/1996 | Hirota et al. | 701/201 |
| 5,825,306 | A | * | 10/1998 | Hiyokawa et al. | 701/209 |
| 5,845,300 | A | * | 12/1998 | Comer et al. | 715/508 |
| 5,964,821 | A | * | 10/1999 | Brunts et al. | 701/201 |
| 6,108,631 | A | * | 8/2000 | Ruhl | 704/270 |

FOREIGN PATENT DOCUMENTS

| DE | 197 42 054 | 1/1999 |
| EP | 0 827 124 | 3/1998 |
| EP | 0827 124 | 3/1998 |
| EP | 0 905 662 | 3/1999 |

* cited by examiner

*Primary Examiner*—David Hudspeth
*Assistant Examiner*—James S. Wozniak
(74) *Attorney, Agent, or Firm*—Kenyon & Kenyon LLP

(57) ABSTRACT

In a device for the entry of names into a navigation system, the selection probability is taken into consideration in entering the names. At least one statistically collected detail or a detail recorded by measurement technology concerning the local characteristics of the area designated by the name is used as a measure for the selection probability.

3 Claims, 2 Drawing Sheets

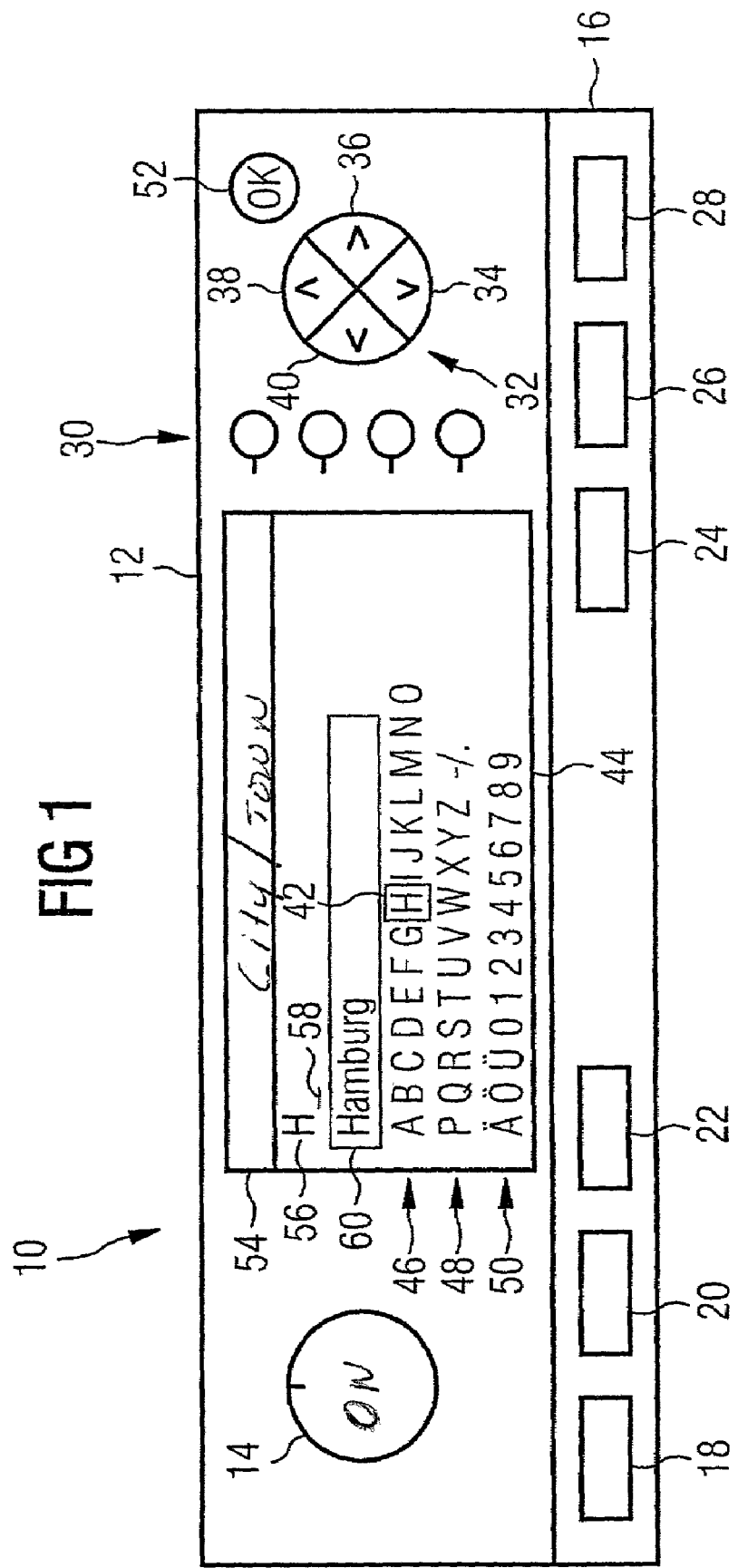

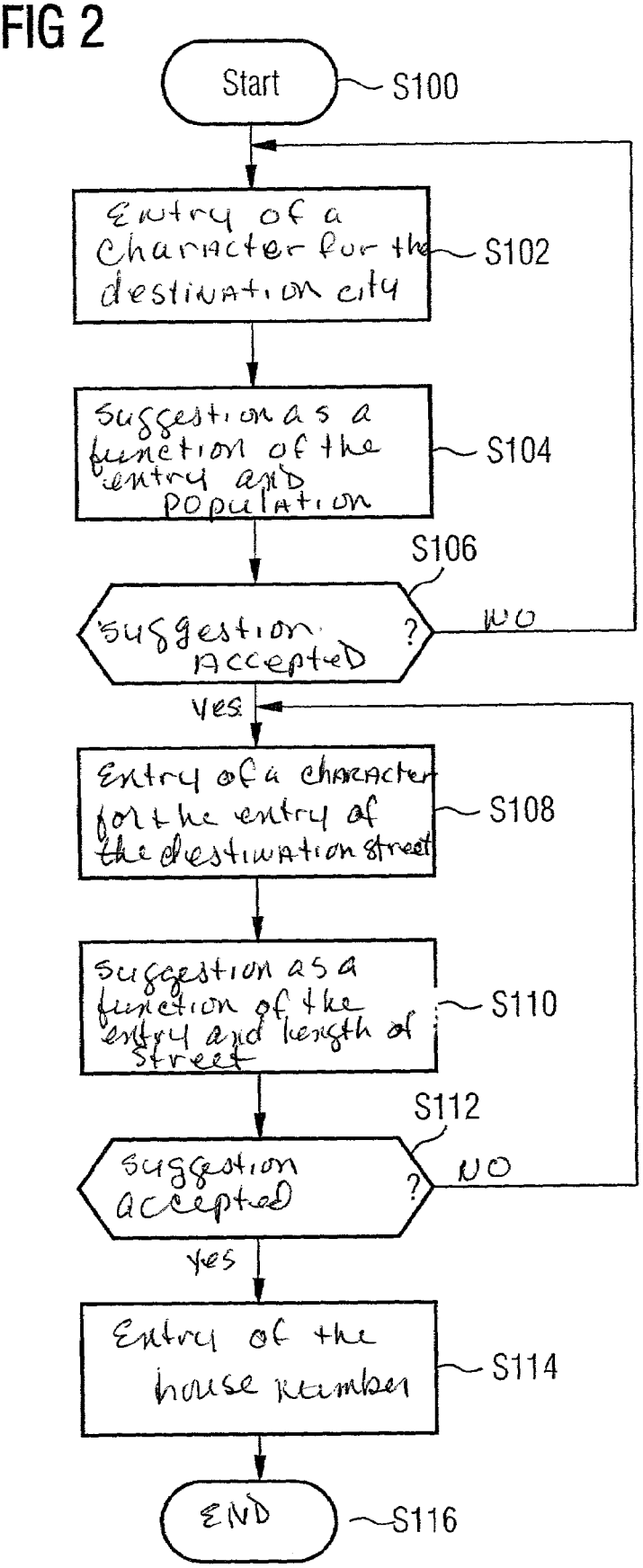

DEVICE FOR INPUTTING NAMES INTO NAVIGATION SYSTEM AND A CORRESPONDING NAVIGATION SYSTEM FOR MOTOR VEHICLES

FIELD OF THE INVENTION

The present invention relates to a device for entering names into a navigation system. The device contains a storage unit to store names of at least one category of geographical information such as country names, city names or street names. In addition, the device contains an input unit to select a name, for example using a small number of keys, rocker switches or rotary transducers. A display unit is used as an input support. An LCD (liquid crystal display) is used, for example, as a display unit. The input device contains, in addition, a control unit, preferably having a processor. Based on a specified sorting criterion for the names of a category and as a function of earlier inputs on the display unit, the control unit initiates the display of a selectable name as a suggestion.

BACKGROUND INFORMATION

In the known motor vehicle navigation system Blaupunkt Travel-Pilot RNS 149, the a alphabetical order is selected as a sorting criterion. The dimensions of the navigation system are comparable to the dimensions of a conventional car radio. Due to the small device dimensions and the limited space in the motor vehicle, no keyboard similar to those customarily used in typewriters or personal computers is used to enter data into the navigation system. Compared to a keyboard, letters and numbers are entered using substantially fewer input elements, e.g., having fewer than ten keys, the input consequently being more involved. The display of a name as a suggestion makes it possible to shorten the input operation if a user confirms the suggestion. At least one name, whose initial sequence of letters coincides with the letters previously entered, is displayed as a preselection.

SUMMARY OF THE INVENTION

An object of the present invention is to provide a simply configured device for the entry of names into a navigation system, with the aid of the input operation is further facilitated. In addition, a navigation system containing this device is provided.

The present invention is based on the consideration that there are names that designate frequently selected destinations and that there are also names that refer to rarely selected destinations. The probability with which a specified place name is selected, i.e., the selection probability, is often correlated with easily acquired data referring to the location designated by the place name.

In the device according to the present invention, the selection probability of the names serves as a sorting criterion in the control unit. At least one statistically collected detail or a detail recorded by measurement concerning the local characteristics of the area designated by the name is used as a measure for the selection probability. The result of these actions is that the user accepts the suggestions made by the control unit more frequently than previously. This reduces the number of characters of a name to be entered until a suggestion is accepted. In other words, the input device is made easier to use.

In a further development of the device of the present invention, the population of the country designated by the country name is used as a measure of the selection probability of a country name. As an alternative or in addition, the population of the city designated by the city name is used as a measure of the selection probability of a city name. In a next further development, the number of residents of the street designated by the street name is used as a measure of the selection probability of a street name. The number of inhabitants or residents is an easily available statistical detail that is updated annually and can be obtained, for example, from a statistical yearbook.

In a next further development, in addition or as an alternative to the number of residents, the street length and/or the number of house numbers of the street designated by the street name is used as a measure of the selection probability of a street name. The street length can be easily read, for example, from city maps. House numbers are also recorded on some city maps.

In determining the sorting sequence taking several criteria into account, the individual criteria are weighted with suitable weighting factors. Additional criteria to determine the sorting sequence are, for example, the number and/or size of hotels, the number of offices, train stations or airports in the vicinity and/or within the area designated by the name. The named details can also be determined with comparatively little effort.

The benefit of the present invention is great in particular if the input unit contains only very few input elements, for example, fewer than ten keys. This is, for example, the case when an input element must be operated multiple times in succession without intermediate and/or without simultaneous operation of other input elements to enter a character assigned to the input element. Such multiple assignment of input elements is also customary, for example, for the entry of text in mobile telephones. Each character that need not be entered via the input element saves the user several seconds of input time.

Even in an input unit having one input element, which serves to select a character to be entered, and with another input element to confirm the selection, the time saved in entering characters is considerable. Arrow keys are used, for example, with which the letters of the alphabet can be selected in succession.

In a further development of the device of the present invention, the sorting criterion is not permanently specified but rather can be selected. For example, the user selects between an alphabetical sorting and a sorting according to selection probabilities. The alphabetical sorting is in particular suitable for selecting from within a selection list of several names displayed on the display unit. However, the user experiences sorting according to selection probability as pleasant when, for example, only one suggestion is displayed on the display unit at a given time.

A second aspect of the present invention relates to a navigation system, for a motor vehicle in particular, which contains the device of the present invention for entering names or one of the further developments of this device.

BRIEF DESCRIPTION OF THE DRAWINGS

FIG. 1 shows the control panel of a navigation system.

FIG. 2 shows procedure steps for entering the destination into the navigation system.

DETAILED DESCRIPTION

FIG. 1 shows a control panel 10 of a navigation system 12 for a motor vehicle. Navigation system 12 guides the person driving the motor vehicle to a previously entered destination using voice announcements. The position of the motor vehicle is updated, for example, using a satellite during the movement of the motor vehicle toward the destination. The left part of control panel 10 contains a power switch 14, using which navigation system 12 can be switched on and off. Power switch 14 is coupled to a rotary knob, using which the sound volume of the announcements of navigation system 12 can be adjusted. A key row 16 in the lower part of control panel 10 contains keys 18 to 28 for the operation of navigation system 12. The function of keys 18 to 28 does not concern the input of destinations; therefore, these functions will not be explained below.

Light emitting diodes 30 are arranged one above the other in the right part of control panel 10 and serve to display specific operating states of navigation system 12. The right part of control panel 10 also contains an input field 32 that contains four input keys 34 to 40, each of which forms one-fourth of a complete circle. Input keys 34 to 40 serve to move an input frame 42 in a liquid crystal display (LCD) 44. Input keys 34 to 40 move the input frame one line down, one character to the right, one line up and one character to the left in this sequence.

The characters that can be selected using input keys 34 to 40 are shown in three lines 46 to 50 of LCD 44. Characters that can be selected are upper case letters A to Z, special characters such as diacritics, and the numbers 0 to 9. A selected character is entered by briefly pressing a confirmation key 52 located above input field 32.

A title line 54 of LCD 44 indicates the name currently entered. In the operating state shown in FIG. 1, the name of the destination city or of a smaller destination town is entered.

An input line 56 is located below title line 54 in LCD 44, the input line showing the already entered letters of a name. In the exemplary embodiment, the letter "H" has already been entered. An input marker 58 shown as an underscore marks the present input position.

Below input line 56 is located a suggestion line 60 in which the control unit of navigation system 12 causes a suggested destination city or destination town to be displayed as a function of the letters of a name already entered and as a function of selection probabilities. In the exemplary embodiment, the city of Hamburg is suggested after the letter H is entered because Hamburg is the most populous city in Germany that starts with the letter "H". The suggestion shown in suggestion line 60 can be accepted by pressing confirmation key 52 briefly two times in succession.

The already mentioned lines 46 to 50 are shown in the lower part of LCD 44.

FIG. 2 shows procedure steps that are executed when a destination is entered into navigation system 12. FIG. 1 will be referred to during the explanation of FIG. 2. The procedure starts in a procedure step S100 before the start of the trip.

In a procedure step S102, the first character of the name of the destination is entered and displayed in LCD 44. In a subsequent procedure step S104, the control unit of navigation system 12 causes a suggestion to be displayed in suggestion line 60 as a function of the previously entered character of the name and as a function of the population of the destinations that start with the character already entered. The name of the city with the highest population is selected from a preselection of the names starting with the sequence of letters entered thus far.

In a procedure step S106, it is checked if the suggestion was accepted by pressing confirmation key 52 two times in immediate succession. If confirmation key 52 is pressed only once, the character presently framed by input frame 42 is entered and the operation is continued in procedure step S102. As a consequence, the process is in an input loop made up of procedure steps S102 to S106. This loop is only left in procedure step S106 if the user accepts the suggestion shown in suggestion line 60 by pressing confirmation key 52 twice. In this case, procedure step S106 is immediately followed by a procedure step S108.

In procedure step S108, the entry of the name of the destination street is initiated. Using input keys 34 to 40, the user selects a character from lines 46 to 50. In a subsequent procedure step S110, the control unit of navigation system 12 determines the streets that start with this character and selects the longest street from these streets. The name of this street is shown in suggestion line 60.

In a procedure step S112, it is then checked if the user has accepted the suggestion for a street name. If this is not the case, the operation is continued in procedure step S108. Using input keys 34 to 40, the user enters additional letters of the name of the destination street. The control unit of navigation system 12 suggests additional names until the loop made up of procedure steps S108 to S112 is left in procedure step S112 by the acceptance of a suggestion. If a suggestion is accepted, procedure step S112 is immediately followed by a procedure step S114.

In procedure step S114, using input keys 34 to 40, the user enters the house number which he or she would like to reach using navigation system 12. The operation is then terminated in a procedure step S116. Navigation system 12 now knows the precise destination and guides the user to this destination by automatically output directional and distance information.

What is claimed is:

1. A device for entering names into a navigation system, comprising:
   a storage unit for storing names of at least one category of geographic information;
   an input unit for selecting a name;
   a display unit for supporting an entry; and
   a control unit for causing a selectable name to be displayed as a suggestion on the display unit as a function of a specified sorting criterion for the stored names of a category and as a function of earlier entries for the selection of the name to be entered,
   wherein a selection probability of the names is used as a sorting criterion in the control unit, and
   wherein at least one of (a) at least one statistically collected information item and (b) an information item recorded by measurement concerning local characteristics of an area designated by a name is used as a measure for the selection probability, and
   wherein at least one of (a) a number of hotels, (b) a size of hotels, (c) a number of offices, (d) a number of train stations and (e) a number of airports within an area designated by a name is used as a measure for the selection probability.

2. A navigation system comprising a device for entering names for geographic information, the device including:
   a storage unit for storing names of at least one category of geographic information;
   an input unit for selecting a name;
   a display unit for supporting an entry; and
   a control unit for causing a selectable name to be displayed as a suggestion on the display unit as a function of a specified sorting criterion for the stored names of a category and as a function of earlier entries for the selection of the name to be entered, wherein a selection probability of the names is used as a sorting criterion in the control unit, and wherein at least one of (a) at least one statistically collected information item and (b) an information item recorded by measurement concerning local characteristics of an area designated by a name is used as a measure for the selection probability, and wherein at least one of (a) a number of hotels, (b) a size of hotels, (c) a number of offices, (d) a number of train stations and (e) a number of airports within an area designated by a name is used as a measure for the selection probability.

3. The navigation system according to claim 2, wherein the navigation system is for a motor vehicle.

* * * * *